Jan. 27, 1959 G. G. RAPP 2,870,872
NON-SKID CAR BLOCK
Filed Aug. 20, 1957
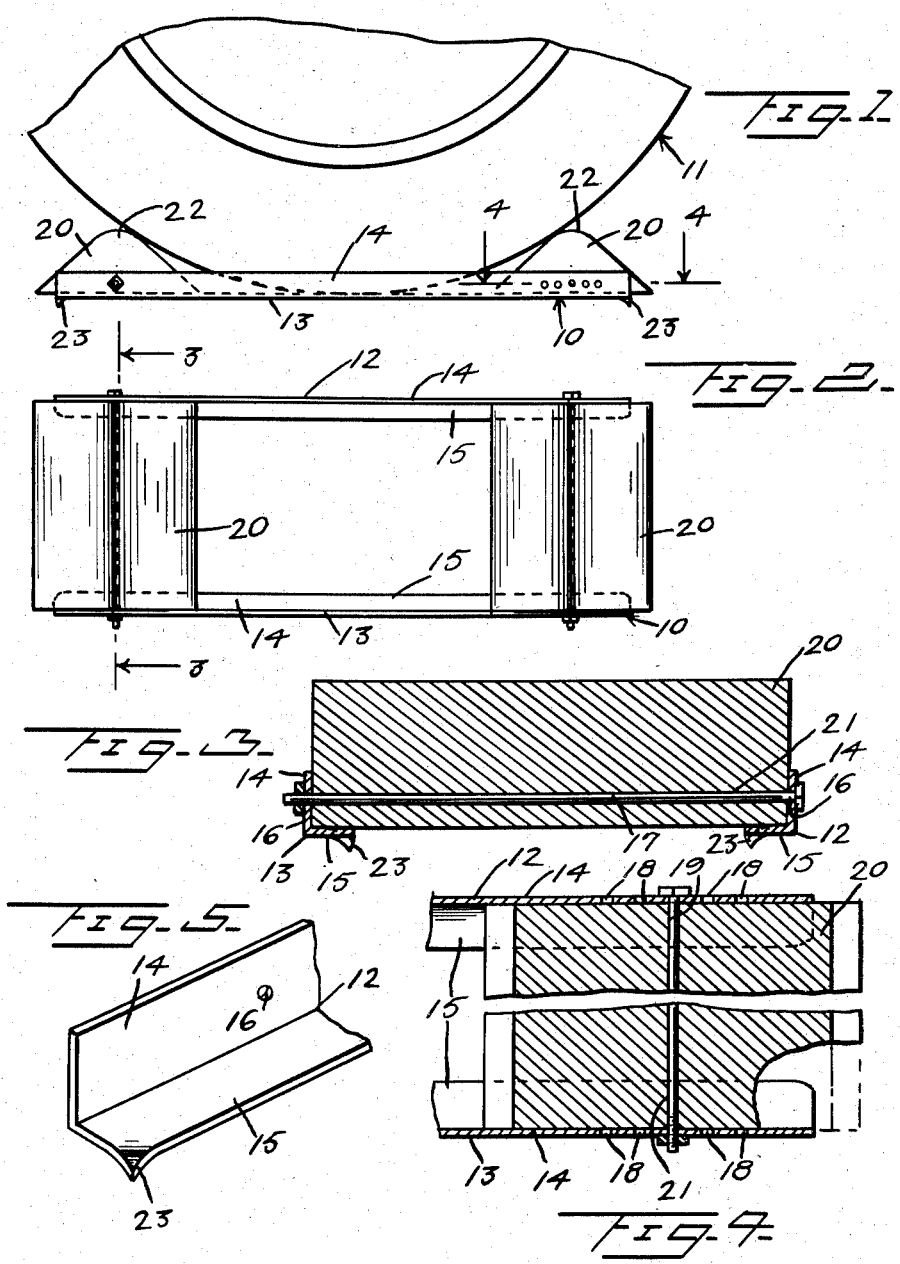
INVENTOR
George G. Rapp
BY Kimmel & Crowell
ATTORNEYS United States Patent Office 2,870,872
Patented Jan. 27, 1959

2,870,872

NON-SKID CAR BLOCK

George G. Rapp, Mendota, Ill.

Application August 20, 1957, Serial No. 679,258

1 Claim. (Cl. 188—32)

The present invention relates to wheel chocks, and more particularly to such chocks which prevent rotation of the wheel in either direction.

The primary object of the invention is to provide a wheel chock which will effectively block the rotation of a wheel in either a forward or reverse direction.

Another object of the invention is to provide a wheel chock of the class described above which can be adjusted for use with wheels of various diameters.

A further object of the invention is to provide a wheel chock of the class described above having means thereon to prevent movement of the chock with respect to the supporting surface.

A still further object of the invention is to provide a wheel chock which is inexpensive to manufacture, easy to use, and which is light in weight for ease in transportation.

Other objects and advantages will become apparent in the following specification when considered in the light of the attached drawings, in which:

Figure 1 is a side elevation of the invention.

Figure 2 is a top plan view of the invention.

Figure 3 is an enlarged transverse vertical cross-section taken along the line 3—3 of Figure 2, looking in the direction of the arrows.

Figure 4 is an enlarged fragmentary transverse horizontal cross-section taken along the line 4—4 of Figure 1, looking in the direction of the arrows.

Figure 5 is a fragmentary perspective view of one end of one of the connecting rails with the blocks removed.

Referring now to the drawings in detail wherein like reference characters indicate like parts throughout the several figures, the reference numeral 10 indicates generally a wheel chock constructed in accordance with the invention.

The wheel chock 10 is constructed for cooperative association with a wheel generally indicated at 11 of the type normally used in motor vehicles.

The wheel chock 10 includes a pair of elongated spaced apart parallel angle iron rails 12 and 13 each having a vertical leg 14 and a horizontal leg 15 extending perpendicularly thereto. The horizontal legs 15 of the rails 12 and 13 extend inwardly toward each other.

The vertical legs 14 adjacent one end of the rails 12 and 13 are provided with aligned bores 16 through which extend an elongated bolt 17. The opposite ends of the rails 12 and 13 are provided with a plurality of spaced bores 18 extending through the vertical legs 14. A bolt 19 extends between the rails 12 and 13 and is positioned in a selected pair of bores 18 in parallel relation to the bolt 17.

A pair of inverted V-shaped blocks 20 are each provided with a transverse bore 21 through which the bolts 17 and 19 extend to secure the blocks 20 to the opposite ends of the rails 12 and 13. The block 20 mounted on the bolt 19 is longitudinally adjustable with respect to the rails 12 and 13 to vary the distance between the blocks 20. The upper ends of the blocks 20 are arcuate in cross-section at 22, as seen in Figure 1.

The rails 12 and 13 have the inner corners 23 of the horizontal portion 15 bent downwardly at an angle forming a prong to engage the supporting surface, preventing the wheel chock 10 from sliding thereon.

In the use and operation of the invention, the wheel 11 is driven over one of the blocks 20 so as to engage between the blocks 20, as shown in Figure 1, and when the need for same is over the vehicle is driven over the block 20 at one end of the wheel chock 10 to disengage the wheel 11 therefrom.

Having thus described the preferred embodiment of the invention, it should be understood that numerous structural modifications and adaptations may be resorted to without departing from the scope of the appended claim.

What is claimed is:

A wheel chock for insertion under the wheel of a car to prevent accidental movement of the car comprising a pair of spaced apart parallel angle iron members each having a vertical leg and a horizontal leg, said horizontal legs being disposed in confronting relation and in the same horizontal plane with respect to each other to serve as trackways, said horizontal legs each having their inner corners downwardly turned, each of said vertical legs having an aperture extending therethrough adjacent one of the ends thereof, said apertures being axially aligned with respect to each other, each of said vertical legs having a plurality of spaced bores extending therethrough adjacent the other end thereof, said bores in one of said vertical legs being axially aligned with a respective one of said bores in the other of said vertical legs, an inverted substantially V-shaped block having a transversely extending aperture adjacent the bottom thereof, the apex of said block being arcuate in cross section, an elongated bolt passing through said transversely extending aperture and said first named apertures in said vertical legs to detachably secure said block between said angle iron members, a second inverted substantially V-shaped block having a transversely extending aperture adjacent the bottom thereof, the apex of said second block being arcuate in cross section, and an elongated bolt passing through said transversely extending aperture and a selected pair of said bores to detachably secure said second block between said angle iron members.

References Cited in the file of this patent

UNITED STATES PATENTS

| | | |
|---|---|---|
| 999,828 | McNaughton | Aug. 8, 1911 |
| 2,418,279 | Sax | Apr. 1, 1947 |
| 2,465,551 | Otterness | Mar. 29, 1949 |

FOREIGN PATENTS

| | | |
|---|---|---|
| 355,872 | Germany | July 8, 1922 |
| 479,363 | Germany | July 15, 1929 |